United States Patent
Tanimoto et al.

(10) Patent No.: US 6,868,722 B2
(45) Date of Patent: Mar. 22, 2005

(54) AIR FLOW RATE MEASURING APPARATUS

(75) Inventors: Koji Tanimoto, Tokyo (JP); Hiroyuki Uramachi, Tokyo (JP); Tomoya Yamakawa, Tokyo (JP); Shingo Hamada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/773,295

(22) Filed: Feb. 9, 2004

(65) Prior Publication Data

US 2004/0226357 A1 Nov. 18, 2004

(30) Foreign Application Priority Data

May 16, 2003 (JP) .............................. 2003-138625

(51) Int. Cl.[7] .............................. G01F 5/00; G01F 1/68; G01M 19/00; G01P 5/00
(52) U.S. Cl. .................. 73/202.5; 73/204.22; 73/118.2
(58) Field of Search .............................. 73/202, 202.5, 73/204.22, 195, 118.2

(56) References Cited

U.S. PATENT DOCUMENTS

| | | | |
|---|---|---|---|
| 5,537,870 A | * 7/1996 | Zurek et al. | .................. 73/202 |
| 5,631,415 A | * 5/1997 | Igarashi et al. | ............ 73/202.5 |
| 5,696,321 A | * 12/1997 | Igarashi et al. | ............ 73/202.5 |
| 5,804,718 A | * 9/1998 | Nagasaka et al. | ............. 73/202 |
| 5,942,683 A | * 8/1999 | Aoi et al. | .................. 73/202.5 |
| 6,220,090 B1 | * 4/2001 | Kohno et al. | ................. 73/202 |
| 6,474,177 B2 | * 11/2002 | Maeda et al. | ............ 73/861.63 |
| 6,526,822 B1 | * 3/2003 | Maeda et al. | ............ 73/204.21 |
| 6,751,621 B1 | * 6/2004 | Calistri-Yeh et al. | ....... 707/100 |

FOREIGN PATENT DOCUMENTS

| | | |
|---|---|---|
| JP | 09-287991 A | 11/1997 |
| JP | 11-284504 A | 9/1999 |

* cited by examiner

*Primary Examiner*—Edward Lefkowitz
*Assistant Examiner*—T Miller
(74) *Attorney, Agent, or Firm*—Sughrue Mion, PLLC

(57) ABSTRACT

A diversion passage is constructed into an inverted U shape in which an upstream diversion passage and a downstream diversion passage each having a passage direction in a direction of projection of a detector flow tube communicate by means of a curved portion. An inflow port is constructed by removing a portion of a wall of the upstream diversion passage on an upstream side in the main direction of flow, and removing a portion of first and second side walls of the upstream diversion passage facing each other in a direction perpendicular to the main direction of flow and the direction of projection of the detector flow tube. In addition, a wall surface on a downstream side of the upstream diversion passage in the main direction of flow at the inflow port is formed into a curved surface shape that is gradually displaced upstream relative to the direction of projection of the detector flow tube to constitute an air lead-in surface.

8 Claims, 5 Drawing Sheets

AIR FLOW RATE MEASURING APPARATUS

BACKGROUND OF THE INVENTION

1. Field of the Invention

The present invention relates to an air flow rate measuring apparatus for outputting a signal in response to a flow rate of a fluid and particularly to an air flow rate measuring apparatus suitable for measuring an intake air flow rate in an internal combustion engine.

2. Description of the Related Art

Improvements in measurement accuracy in low flow rate regions and improvements in measurement accuracy during transitions are required in conventional air flow rate measuring apparatuses used to measure the flow rate of intake air in internal combustion engines due to the expansion of measurement ranges for intake air flow rate accompanying increased output in internal combustion engines and also due to the tightening of emission regulations.

In conventional air flow rate measuring apparatuses, a diversion passage having an inverted U shape in which two adjacent, parallel channels are linked by a curved portion is installed inside an airflow channel. Thus, the overall length of the diversion passage is increased, reducing surges inside the diversion passage resulting from surges in the flow of air inside the airflow channel. In addition, the curved portion of the diversion passage and a downstream passage of the diversion passage are formed into a shape that suppresses contracted flow arising downstream from the curved portion. Thus, flow rate measuring precision is improved by suppressing decreases in flow velocity due to contracted flow to maintain flow velocity inside the diversion passage even in the low flow rate regions.

However, in conventional air flow rate measuring apparatuses, since side walls facing each other in a direction perpendicular to the direction of a main flow are present at an inflow port into the diversion passage, a portion of the flow having an angle inclined) relative to the parallel flow of the main flow is obstructed by the side walls and is prevented from flowing into the diversion passage. Thus, increased flow rate sensitivity due to increased flow velocity inside the diversion passage becomes minimal. Consequently, the flow velocity inside the diversion passage is slow, leading to a decrease in the flow rate sensitivity and making output of the flow rate signal unstable.

Since the side walls facing each other in the direction perpendicular to the direction of the main flow have a predetermined thickness in a direction perpendicular to the direction of flow of the main flow, the flow of the main flow colliding with the side walls at right angles is interrupted temporarily by the side walls, giving rise to a delay before flowing into the diversion passage. Consequently, the state of the flow into the diversion passage is unstable, making output of the flow rate signal unstable.

In air flow rate measuring apparatuses for internal combustion engines, foreign matter such as droplets of liquid (water, oil, etc.), dust etc., contained in the air flowing through the airflow channel is blown and introduced into the diversion passage from the upstream end. When this foreign matter such as droplets of liquid, dust, etc., adheres to inner wall surfaces of the diversion passage or the flow rate detecting element, there is a risk that the flow velocity distribution inside the diversion passage, and the heat-transfer coefficient of the surface of the flow rate detecting element, etc., may change, giving rise to changes in the output of the flow rate signal. In conventional air flow rate measuring apparatuses, because the side walls facing each other in the direction perpendicular to the direction of a main flow are present at the inflow port into the diversion passage and the flow velocity inside the diversion passage is slow, foreign matter that has been introduced into the diversion passage and has adhered to the inner wall surfaces of the diversion passage is unlikely to be blown back out through an outflow port by the flow inside the diversion passage and most of it remains inside the diversion passage. Consequently, output fluctuations in the flow rate signal may become large depending on the location and amount of adhesion of foreign matter, preventing accurate flow rate detection.

SUMMARY OF THE INVENTION

The present invention aims to solve the above problems and an object of the present invention is to provide an air flow rate measuring apparatus capable of improving flow rate detecting precision and enabling a stable flow rate signal to be obtained even if a flow of air inside an intake air line becomes slightly nonuniform by stabilizing the flow of air and enabling more air to be directed inside a diversion passage, and also capable of suppressing the influence of droplets of liquid and dust introduced into the diversion passage, thereby ensuring high flow rate measuring precision.

With the above object in view, an air flow rate measuring apparatus of the present invention includes a detector flow tube projecting into an airflow channel so as to be perpendicular to a main direction of flow of air inside the airflow channel, a diversion passage through which a portion of the air is permitted to flow being formed in the detector flow tube; and a flow rate detecting element disposed inside the diversion passage. The diversion passage is constructed into an inverted U shape in which an upstream diversion passage and a downstream diversion passage each having a passage direction in a direction of projection of the detector flow tube communicate by means of a curved portion. An inflow port of the diversion passage is constructed by removing a portion of a wall of the upstream diversion passage on an upstream side in the main direction of flow of the air, and removing at least a portion of first and second side walls of the upstream diversion passage facing each other in a direction perpendicular to the main direction of flow of the air and the direction of projection of the detector flow tube. A wall surface on a downstream side of the upstream diversion passage in the main direction of flow of the air at the inflow port is formed into a curved surface shape that is gradually displaced upstream relative to the direction of projection of the detector flow tube to constitute an air lead-in surface.

Therefore, an air flow rate measuring apparatus can provided that is capable of improving flow rate detecting precision and enabling a stable flow rate signal to be obtained by stabilizing the flow of air and enabling more air to be directed inside the diversion passage, and also capable of suppressing the influence of droplets of liquid and dust introduced into the diversion passage, thereby ensuring high flow rate measuring precision.

DETAILED DESCRIPTION OF THE PREFERRED EMBODIMENTS

Preferred embodiments of the present invention will now be explained with reference to the drawings.

Embodiment 1

Figure 1:
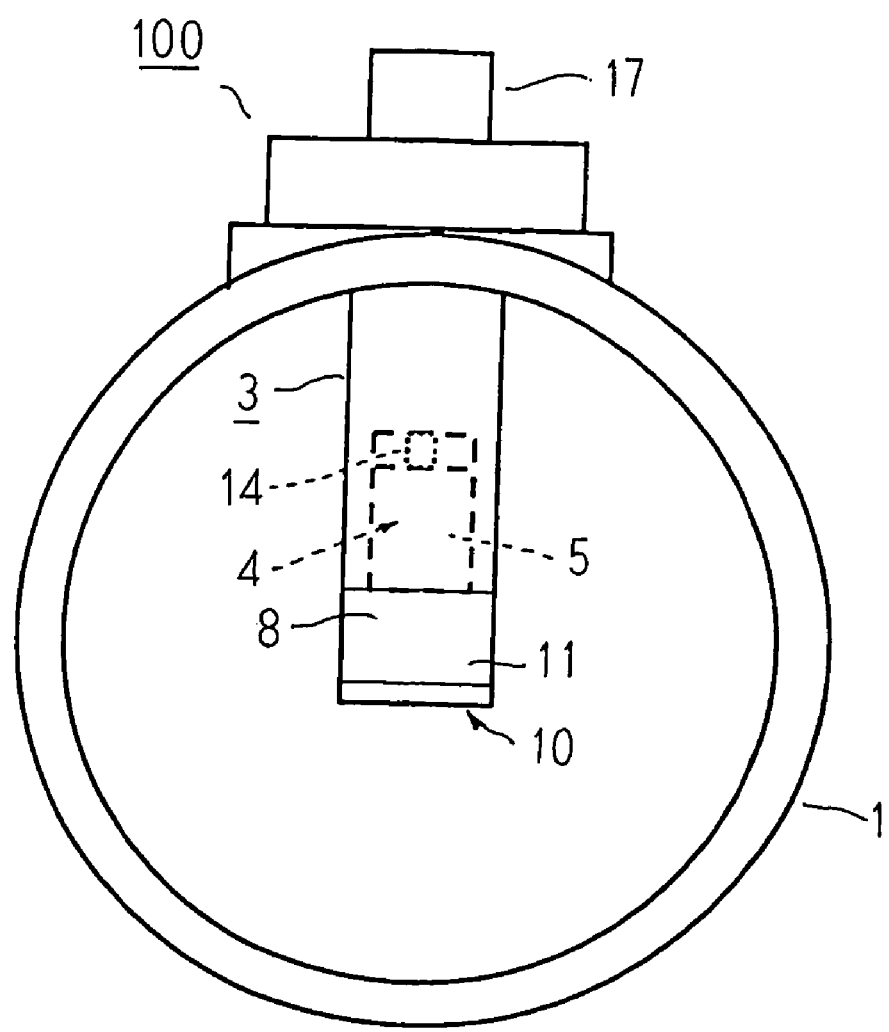
FIG. 1 is a front elevation showing a mounted state of an air flow rate measuring apparatus according to Embodiment 1 of the present invention.
Figure 2:
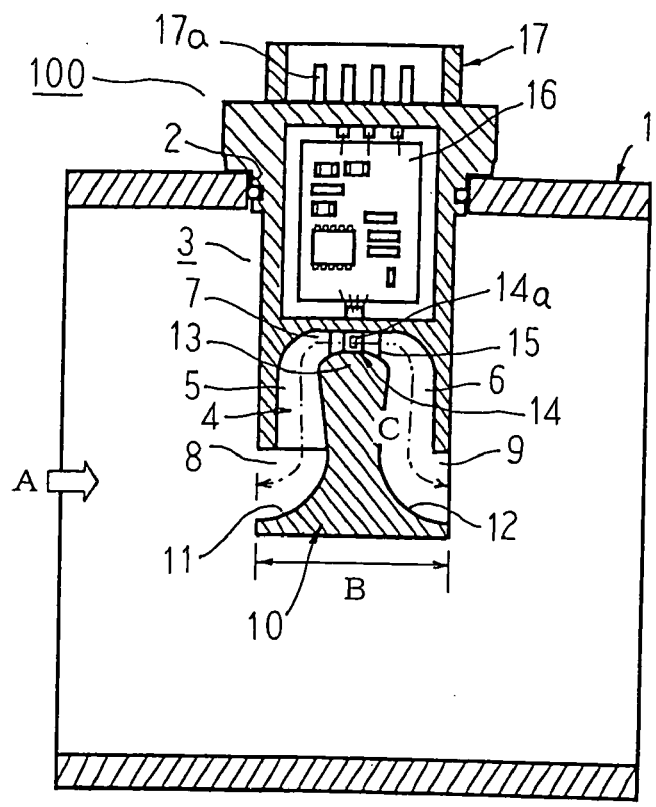
FIG. 2 is a longitudinal section showing the mounted state of the air flow rate measuring apparatus according to Embodiment 1 of the present invention.
Figure 3:
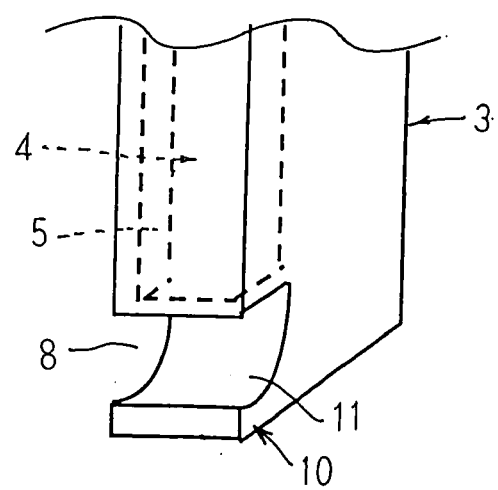
FIG. 3 is a perspective showing a vicinity of an inflow port of the air flow rate measuring apparatus according to Embodiment 1 of the present invention.

FIG. 1 is a front elevation showing a mounted state of an air flow rate measuring apparatus according to Embodiment 1 of the present invention, FIG. 2 is a longitudinal section showing the mounted state of the air flow rate measuring apparatus according to Embodiment 1 of the present invention, and FIG. 3 is a perspective showing a vicinity of an inflow port of the air flow rate measuring apparatus according to Embodiment 1 of the present invention.

In FIGS. 1 to 3, an air flow rate measuring apparatus 100 includes: a detector flow tube 3; a circuit module 16; and a connector portion 17. The air flow rate measuring apparatus 100 is mounted as a plug-in system to a mounting aperture 2 formed at a predetermined position on an intake air line 1 (an airflow channel) of an internal combustion engine. More specifically, the air flow rate measuring apparatus 100 is mounted airtightly to the intake air line 1 such that the detector flow tube 3 projects inside the intake air line 1 so as to be perpendicular to a main direction of flow A of air. Moreover, the main direction of flow A of the air is parallel to a central axis of the intake air line 1.

A diversion passage 4 through which a portion of the air flowing inside the intake air line 1 is permitted to flow is formed in the detector flow tube 3. This diversion passage 4 is constructed into an inverted U shape in which upstream and downstream diversion passages 5 and 6 extending in a radial direction of the intake air line 1 are linked by a curved portion 7. Moreover, the upstream and downstream diversion passages 5 and 6 are disposed side by side in the direction of the main direction of flow A of the air flowing inside the intake air line 1.

An inflow port 8 of the diversion passage 4 is formed by removing a portion of a wall of the upstream diversion passage 5 positioned on an upstream side relative to the main direction of flow A of the air, and removing portions of first and second side walls of the upstream diversion passage 5 facing each other in a direction perpendicular to the main direction of flow A of the air and the axial direction (the direction of projection) of the detector flow tube 3. On the other hand, a discharge port 9 of the diversion passage 4 is formed by removing a portion of only a wall of the upstream diversion passage 6 positioned on a downstream side relative to the main direction of flow A of the air.

In a partition wall 10 separating the upstream and downstream diversion passages 5 and 6, wall surfaces facing the upstream and downstream diversion passages 5 and 6 are each formed into a curved surface curved relative to the main direction of flow A of the air. More specifically, the wall surface on the downstream side of the upstream diversion passage 5 at the inflow port 8 is formed into a curved surface shape that is gradually displaced upstream relative to the direction of projection of the detector flow tube 3 (as it approaches the projecting end) to constitute an air lead-in surface 11. The wall surface on the upstream side of the downstream diversion passage 6 at the discharge port 9 is formed into a curved surface shape that is gradually displaced downstream relative to the direction of projection of the detector flow tube 3 to constitute an air discharge surface 12.

In addition, a throttle portion 13 is formed on a region facing the curved portion 7. Thus, the diversion passage 4 is constructed such that the passage cross-sectional area thereof reduces gradually from the inflow port 8 of the upstream diversion passage 5 to the curved portion 7, is smallest at a central portion of the curved portion 7, and enlarges gradually from the curved portion 7 to the discharge port 9 of the downstream diversion passage 6 so that the flow does not separate. Moreover, from the viewpoint of responsiveness and detecting precision, it is desirable for a ratio between channel length B in the main direction of flow A of the air and channel length C of the diversion passage 4 (diversion passage length ratio C/B) to be in a range from 2 to 4.

A flow rate detecting element 14 is constructed into a diaphragm construction by forming a pair of first and second heat-generating elements composed of a thermosensitive resistor film, for example, on a first surface of a silicon substrate so as to line up in the direction of flow and removing a portion of the silicon substrate under the region where the heat-generating elements are formed from a second surface by etching, etc. This flow rate detecting element 14 is mounted to a chip holder 15 disposed in the curved portion 7. The flow rate detecting element 14 is disposed in a generally central portion of the curved portion 7 such that the surface on which the heat-generating elements are formed (the detecting surface) 14a is parallel to or has an inclination of several degrees to the direction of flow.

The circuit module 16 is mounted with electronic components to constitute a flow rate detecting circuit and is embedded in a root portion of the detector flow tube 3. The connector portion 17 is formed integrally at an opposite end of the detector flow tube 3 from the diversion passage. The flow rate detecting element 14 and the circuit module 16 are electrically connected to each other by bonding wires, etc., and the circuit module 16 and terminals 17a of the connector portion 17 are also electrically connected to each other by bonding wires, etc.

The air flow rate measuring apparatus 100 constructed in this manner is plugged into the intake air line 1 such that the air lead-in surface 11 of the detector flow tube 3 is positioned at the central axis of the intake air line 1. Air flows through the intake air line 1 in the main direction of flow A and flows through the inflow port 8 into the diversion passage 4. The air flows through the upstream diversion passage 5, the curved portion 7, and the downstream diversion passage 6, and then flows out through the discharge port 9 of the diversion passage 4 into the intake air line 1.

At the same time, the pair of heat-generating elements are heated by passing an electric current through them. Then, output based on the difference between the rate of heat transfer from the first and second heat-generating elements to the air is extracted from the circuit module 16 as a flow rate signal by means of the connector portion 17.

In Embodiment 1, the inflow port 8 of the diversion passage 4 is formed by removing a portion of a wall of the upstream diversion passage 5 positioned on an upstream side relative to the main direction of flow A of the air, and removing portions of first and second side walls of the upstream diversion passage 5 facing each other in a direction perpendicular to the main direction of flow A of the air and the axial direction (the direction of projection) of the detector flow tube 3. Thus, at the inflow port 8, since there are no side walls facing each other in a direction perpendicular to the main direction of flow A of the air, not only the flow of air parallel to the main direction of flow A, but also the flow of air having an angle relative to the main direction of flow A flows into the diversion passage 4 smoothly, increasing the flow rate (the flow velocity) inside the diversion passage 4.

The wall surface on the downstream side of the upstream diversion passage 5 in the inflow port 8 is formed into a curved surface shape that is gradually displaced upstream relative to the direction of projection of the detector flow tube 3 to constitute an air lead-in surface 11. Thus, the air collides with the air lead-in surface 11 and is then directed inside the upstream diversion passage 5 effectively by the curved surface shape of the air lead-in surface 11, increasing the flow rate (the flow velocity) inside the diversion passage 4.

Thus, even if foreign matter such as droplets of liquid, dust, etc., adheres to wall surfaces of the diversion passage 4 or to the detecting surface 14a of the flow rate detecting element 14, foreign matter that has adhered is blown further downstream by the air flowing through the diversion passage 4. Thus, changes in heat-transfer coefficient resulting from foreign matter such as droplets of liquid, dust, etc., adhering to the detecting surface 14a of the flow rate detecting element 14 and disturbances to the flow of air resulting from foreign matter adhering to the wall surfaces of the diversion passage 4 are suppressed, making output variations less likely to occur, thereby improving the reliability of flow rate detection.

In addition, because the flow velocity inside the diversion passage 4 is increased, flow rate detecting precision is raised.

At the inflow port 8, since there are no side walls facing each other in a direction perpendicular to the main direction of flow A, there is no delay resulting from the flow of the air colliding with the side walls. Thus, the state of the air flowing into the diversion passage 4 is stable, providing stable flow rate signal output. In addition, even if foreign matter such as droplets of liquid, dust, etc., adheres to the air lead-in surface 11, the foreign matter is more likely to be blown further downstream by the flow of air flowing along the side portions of the detector flow tube 3.

A throttle portion 13 is disposed in a region of the curved portion 7, the diversion passage 4 being constructed such that the passage cross-sectional area thereof gradually decreases from the inflow port 8 of the upstream diversion passage 5 to the curved portion 7, is smallest at a central portion of the curved portion 7, and gradually increases from the curved portion 7 to the discharge port 9 of the downstream diversion passage 6 so that the flow of air does not separate. Here, the flow velocity at the detecting surface portion of the flow rate detecting element 14 is increased and the flow is stabilized. Thus, flow rate measuring precision can be improved even in low flow rate regions.

Because the discharge port 9 of the diversion passage 4 has wall surfaces that face each other in a direction perpendicular to the main direction of flow A, air that has flowed through the downstream diversion passage 6 is smoothed as it passes through the discharge port 9 and merges with the main flow. Thus, confluence loss at the discharge port 9 is reduced, maintaining the flow velocity inside the diversion passage 4.

The wall surface on the upstream side of the downstream diversion passage 6 in the discharge port 9 is formed into a curved surface shape that is gradually displaced downstream relative to the direction of projection of the detector flow tube 3 to constitute an air discharge surface 12. Thus, because air that has flowed through the downstream diversion passage 6 is deflected into the main direction of flow A by the air discharge surface 12 before being discharged into the intake air line 1, confluence loss at the discharge port 9 is reduced.

The detector flow tube 3 is mounted so as to project into the intake air line 1 such that the air lead-in surface 11 of the detector flow tube 3 is positioned at the central axis of the intake air line 1. In the vicinity of the central axis of the intake air line 1, the flow velocity distribution (static pressure distribution) is stable and the flow velocity is high. Thus, even if the velocity distribution of the main flow of the air flowing through the intake air line 1 varies to some extent, the static pressure difference at the flow inlet 8 will not vary significantly. Consequently, even if the velocity distribution of the main flow of the air flowing through the intake air line 1 varies to some extent, the flow velocity of the air flowing through the diversion passage 4 will not vary, thereby providing an accurate flow rate signal.

Embodiment 2

Figure 4:
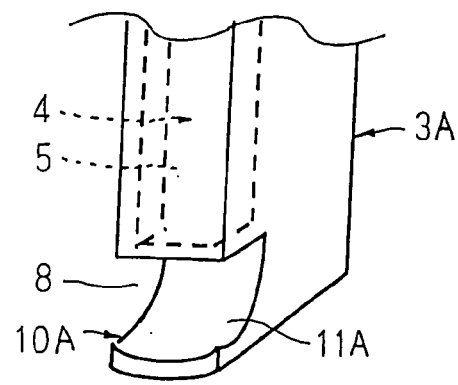
FIG. 4 is a perspective showing a vicinity of an inflow port of an air flow rate measuring apparatus according to Embodiment 2 of the present invention.

FIG. 4 is a perspective showing a vicinity of an inflow port of an air flow rate measuring apparatus according to Embodiment 2 of the present invention.

In FIG. 4, a wall surface of a partition wall 10A facing an upstream diversion passage 5, in other words, an air lead-in surface 11A, is formed into a concave surface shape that is gradually displaced upstream from a central portion toward first and second sides relative to a direction perpendicular to the main direction of flow A and the axial direction (the direction of projection) of a detector flow tube 3A.

Moreover, the rest of this embodiment is constructed in a similar manner to Embodiment 1 above.

In Embodiment 2, air flowing through the intake air line 1 in the main direction of flow A collides with the air lead-in surface 11A. The air that collides with the air lead-in surface 11A, in a similar manner to Embodiment 1 above, is directed inside the upstream diversion passage 5 by the curved surface shape that is gradually displaced upstream relative to the axial direction of the detector flow tube 3A. Here, because the direction of flow of the air that collides with the air lead-in surface 11A and is directed inside the upstream diversion passage 5 is directed toward a central axis of the upstream diversion passage 5 by the concave surface shape that is gradually displaced upstream from a central portion toward first and second sides relative to a direction perpendicular to the main direction of flow A and the axial direction of the detector flow tube 3, the flow velocity in a central portion of the diversion passage 4 is accelerated.

Consequently, disturbances to the flow of air at the inflow port 8 of the diversion passage 4 are reduced, stabilizing the flow of air in the region where the flow rate detecting element 14 is disposed, thereby reducing output disturbances in the air flow rate measuring apparatus.

Embodiment 3

Figure 5:
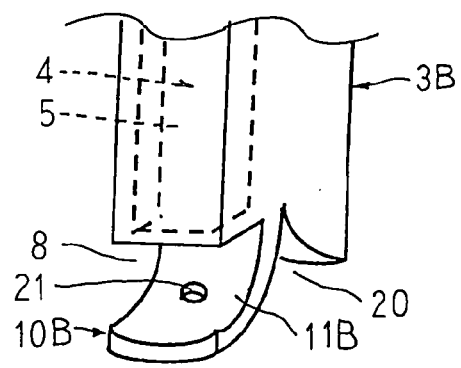
FIG. 5 is a perspective showing a vicinity of an inflow port of an air flow rate measuring apparatus according to Embodiment 3 of the present invention.

FIG. 5 is a perspective showing a vicinity of an inflow port of an air flow rate measuring apparatus according to Embodiment 3 of the present invention.

In FIG. 5, an air lead-in surface 11B is formed, in a similar manner to the air lead-in surface 11A in Embodiment 2 above, into a concave surface shape that is gradually displaced upstream from a central portion toward first and second sides relative to a direction perpendicular to the main direction of flow A and the axial direction (the direction of projection) of a detector flow tube 3B. A recess portion 20 is formed in a tip portion of a partition wall 10B, and a penetrating aperture 21 is disposed through the partition wall 10B so as to communicate between the inflow port 8 and the recess portion 20 at a position of a central portion of the air lead-in surface 11B.

Moreover, the rest of this embodiment is constructed in a similar manner to Embodiment 2 above.

In Embodiment 3, when foreign matter such as droplets of liquid or dust, etc., contained in the air adheres to the air lead-in surface 11B, the foreign matter is moved to the central portion by the concave surface shape of the air lead-in surface 11B, flows through the penetrating aperture 21 into the recess portion 20, and is blown away by the air flowing past the tip of the detector flow tube 3B.

As the air flows past the tip of the detector flow tube 3B, vortexes are generated inside the recess portion 20, reducing the pressure inside the recess portion 20. Thus, a pressure difference is generated between the inflow port 8 and the inside of the recess portion 20, promoting the flow of the foreign matter that has adhered to the air lead-in surface 11B through the penetrating aperture 21 to the recess portion 20.

Consequently, foreign matter that has adhered to the air lead-in surface 11B is more likely to be blown away by the air flowing through the intake air line 1 by means of the penetrating aperture 21, suppressing entry into the diversion passage 4 of the foreign matter contained in the air.

Thus, according to Embodiment 3, in addition to the effects of Embodiment 2 above, the influence of foreign matter such as droplets of liquid or dust, etc., contained in the air can be reduced.

Embodiment 4

Figure 6:
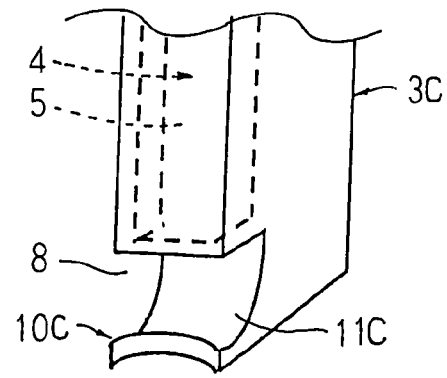
FIG. 6 is a perspective showing a vicinity of an inflow port of an air flow rate measuring apparatus according to Embodiment 4 of the present invention.

FIG. 6 is a perspective showing a vicinity of an inflow port of an air flow rate measuring apparatus according to Embodiment 4 of the present invention.

In FIG. 6, a wall surface of a partition wall 10C facing an upstream diversion passage 5, in other words, an air lead-in surface 11C, is formed into a convex surface shape that is gradually displaced downstream from a central portion toward first and second sides relative to a direction perpendicular to the main direction of flow A and the axial direction (the direction of projection) of a detector flow tube 3C.

Moreover, the rest of this embodiment is constructed in a similar manner to Embodiment 1 above.

In Embodiment 4, air flowing through the intake air line 1 in the main direction of flow A collides with the air lead-in surface 11C. The air that collides with the air lead-in surface 11C, in a similar manner to Embodiment 1 above, is directed inside the upstream diversion passage 5 by the curved surface shape that is gradually displaced upstream relative to the axial direction of the detector flow tube 3C. Here, when foreign matter such as droplets of liquid or dust, etc., contained in the air adheres to the air lead-in surface 11C, the foreign matter that has adhered to the air lead-in surface 11C is moved to first and second side portions of the air lead-in surface 11C by the convex surface shape that is gradually displaced downstream toward the first and second sides from the central portion relative to a direction perpendicular to the main direction of flow A and the axial direction of the detector flow tube 3C, merges with the air flowing past side portions of the detector flow tube 3C, and is blown away.

Consequently, foreign matter such as droplets of liquid or dust, etc., that has adhered to the wall surface is more likely to be blown away by the air flowing past the side portions of the detector flow tube 3C, suppressing entry into the diversion passage 4 of the foreign matter contained in the air.

Thus, according to Embodiment 4, in addition to the effects of Embodiment 1 above, the influence of foreign matter such as droplets of liquid or dust, etc., contained in the air can be reduced.

Embodiment 5

Figure 7:
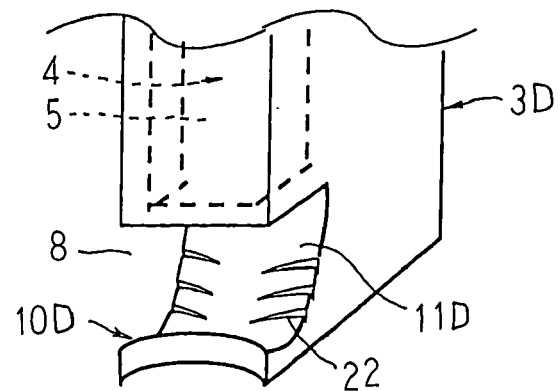
FIG. 7 is a perspective showing a vicinity of an inflow port of an air flow rate measuring apparatus according to Embodiment 5 of the present invention.

FIG. 7 is a perspective showing a vicinity of an inflow port of an air flow rate measuring apparatus according to Embodiment 5 of the present invention.

In FIG. 7, a wall surface of a partition wall 10D facing the upstream diversion passage 5, in other words, an air lead-in surface 11D, is formed, in a similar manner to the air lead-in surface 11C in Embodiment 4 above, into a convex surface shape that is gradually displaced downstream from a central portion toward first and second sides relative to a direction perpendicular to the main direction of flow A and the axial direction (the direction of projection) of a detector flow tube 3D. A plurality of concave discharge lanes 22 are formed on the air lead-in surface 11D so as to extend from a central portion to first and second side edges.

Moreover, the rest of this embodiment is constructed in a similar manner to Embodiment 4 above.

In Embodiment 5, when foreign matter such as droplets of liquid or dust, etc., contained in the air adheres to the air lead-in surface 11D, the foreign matter moves across the air lead-in surface 11D and is caught in the discharge lanes 22, is moved along the discharge lanes 22 to first and second side portions of the air lead-in surface 11D, merges with the air flowing past side portions of the detector flow tube 3D, and is blown away.

Thus, according to Embodiment 5, because foreign matter that has adhered to the air lead-in surface 11D is caught in the discharge lanes 22 and blown away effectively, the influence of foreign matter contained in the air can be reduced.

Moreover, in Embodiment 5 above, the discharge lanes 22 are formed into a concave shape, but the discharge lanes 22 are not limited to a concave shape and may also be formed into a convex shape, for example.

Embodiment 6

Figure 8:
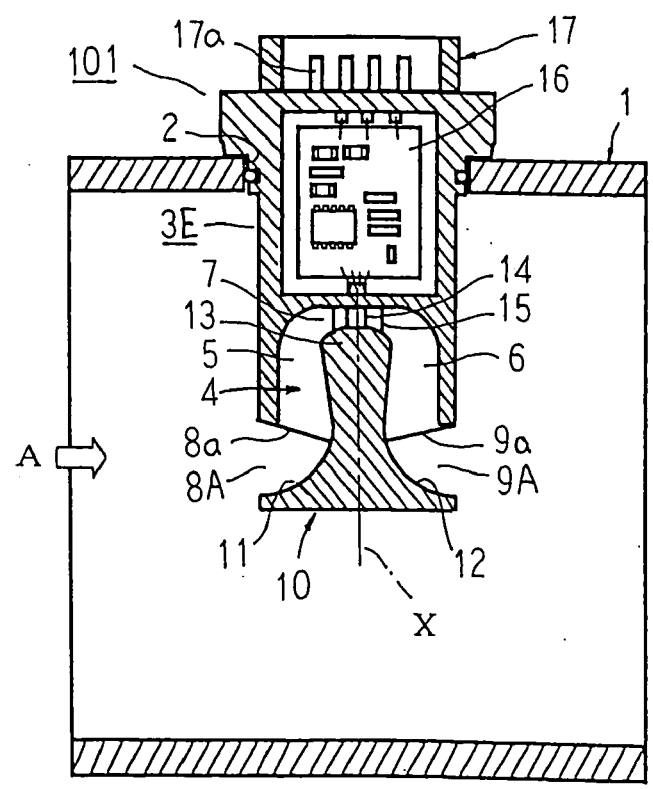
FIG. 8 is a longitudinal section showing a vicinity of an inflow port of an air flow rate measuring apparatus according to Embodiment 6 of the present invention.

FIG. 8 is a longitudinal section showing a vicinity of an inflow port of an air flow rate measuring apparatus according to Embodiment 6 of the present invention.

In FIG. 8, an inflow port 8A of a diversion passage 4 is formed by removing a portion of a wall of an upstream diversion passage 5 positioned on an upstream side relative to the main direction of flow A of the air, and removing almost all of first and second side walls of the upstream diversion passage 5 facing each other in a direction perpendicular to the main direction of flow A of the air and the axial direction (the direction of projection) of a detector flow tube 3E. Similarly, a discharge port 9A of the diversion passage 4 is formed by removing a portion of a wall of a downstream diversion passage 6 positioned on a downstream side relative to the main direction of flow A of the air, and removing almost all of first and second side walls of the downstream diversion passage 6 facing each other in a direction perpendicular to the main direction of flow A of the air and the axial direction (the direction of projection) of a detector flow tube 3E. In other words, the first and second side walls of the upstream diversion passage 5 and the downstream diversion passage 6 are removed in such a way that an aperture face 8a of the inflow port 8A and an aperture face 9a of the outflow port 9A of the diversion passage 4 constitute inclined faces relative to the main direction of flow A.

The detector flow tube 3E is constructed so as to be symmetrical relative to a plane that is perpendicular to the main direction of flow A and passes through a central axis X of the detector flow tube 3E. More specifically, the diversion passage 4, the inflow port 8A, the discharge port 9A, the air lead-in surface 11, and the air discharge surface 12 are constructed so as to be symmetrical relative to the plane that is perpendicular to the main direction of flow A and passes through the central axis X of the detector flow tube 3E.

Moreover, the rest of this embodiment is constructed in a similar manner to Embodiment 1 above.

In the air flow rate measuring apparatus 101 constructed in this manner, since the inflow port 8A has no side walls facing each other in a direction perpendicular to the main direction of flow A and the axial direction of the detector flow tube 3E, in a similar manner to Embodiment 1 above, not only the flow of air parallel to the main direction of flow A, but also the flow of air having an angle relative to the main direction of flow A flows into the diversion passage 4 smoothly, increasing the flow rate (the flow velocity) inside the diversion passage 4.

The wall surface on the downstream side of the upstream diversion passage 5 in the inflow port 8A is formed into a curved surface shape that is gradually displaced upstream relative to the direction of projection of the detector flow tube 3 to constitute an air lead-in surface 11. Thus, the air collides with the air lead-in surface 11 and is then directed inside the upstream diversion passage 5 effectively by the curved surface shape of the air lead-in surface 11, increasing the flow rate (the flow velocity) inside the diversion passage 4.

At the inflow port 8A, since there are no side walls facing each other in a direction perpendicular to the main direction of flow A, there is no delay resulting from the flow of the air colliding with the side walls.

Consequently, similar effects to those in Embodiment 1 above can also be achieved in Embodiment 6.

In Embodiment 6, the diversion passage 4, the inflow port 8A, the discharge port 9A, the air lead-in surface 11, and the air discharge surface 12 are constructed so as to be symmetrical relative to a plane that is perpendicular to the main direction of flow A and passes through a central axis X of the detector flow tube 3E. Thus, even if air flows through the intake air line 1 in a reverse direction to the main direction of flow A, because air having an angle relative to the main direction of flow A flows smoothly through the discharge port 9A into the downstream diversion passage 6, and air that collides with the air discharge surface 12 is directed inside the downstream diversion passage 6 effectively by the curved surface shape of the air discharge surface 12, and in addition, there is no delay resulting from the flow of air colliding with side walls, the flow rate of the air can be detected with high precision. Consequently, this air flow rate measuring apparatus 101 can provide stable output characteristics for bidirectional flow inside the intake air line 1.

The aperture face 8a of the inflow port 8A and the aperture face 9a of the outflow port 9A form inclined faces relative to the main direction of flow A. Thus, the rate of air flow flowing into the diversion passage 4 can be changed by setting the angle of inclination of the aperture face 8a and 9a appropriately to adjust the flow velocity inside the diversion passage 4.

Embodiment 7

Figure 9:
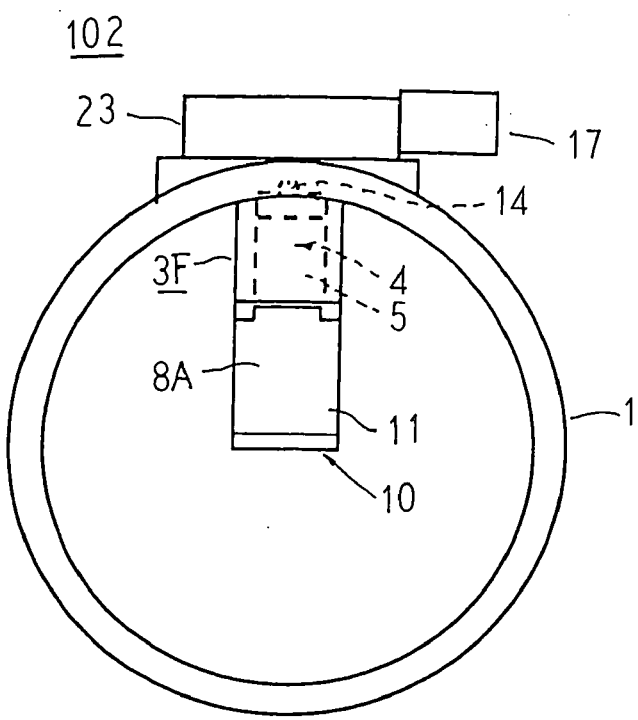
FIG. 9 is a front elevation showing a mounted state of an air flow rate measuring apparatus according to Embodiment 7 of the present invention.
Figure 10:
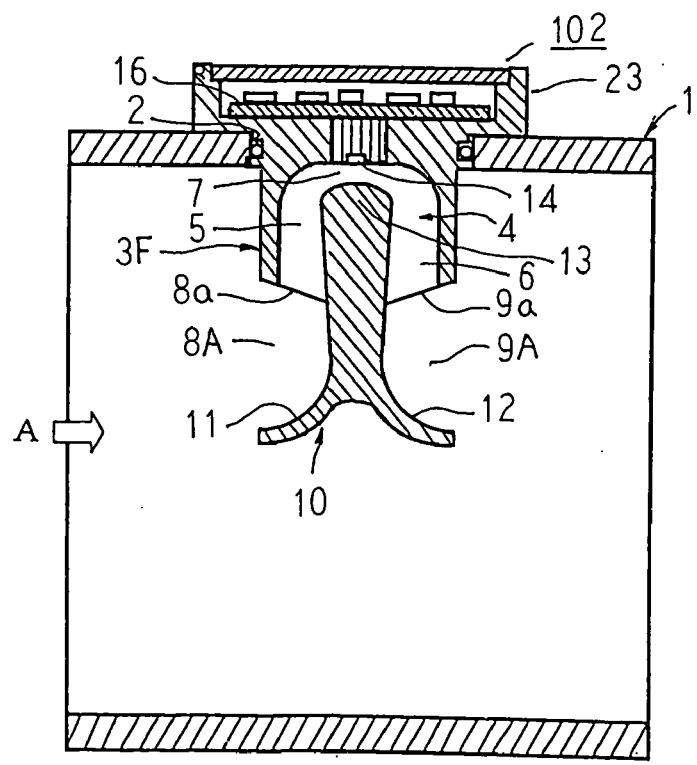
FIG. 10 is a longitudinal section showing the mounted state of the air flow rate measuring apparatus according to Embodiment 7 of the present invention.

FIG. 9 is a front elevation showing a mounted state of an air flow rate measuring apparatus according to Embodiment 7 of the present invention, and FIG. 10 is a longitudinal section showing the mounted state of the air flow rate measuring apparatus according to Embodiment 7 of the present invention.

In FIGS. 9 and 10, a flow rate detecting element 14 is disposed in a central position of a curved portion 7 of a diversion passage 4 such that the detecting surface thereof is positioned in a common plane with a wall surface of the curved portion 7. A circuit case 23 is formed integrally at an opposite end of a detector flow tube 3F from a diversion passage, a circuit module 16 being disposed inside the circuit case 23. In addition, a connector portion 17 is formed integrally with the circuit case 23.

Moreover, the rest of this embodiment is constructed in a similar manner to Embodiment 6 above.

In a air flow rate measuring apparatus 102 constructed in this manner, because the flow rate detecting element 14 is disposed such that the detecting surface thereof is positioned in a common plane with a wall surface of the curved portion 7, ventilation resistance inside the diversion passage 4 can be reduced compared to Embodiment 6 above in which the flow rate detecting element 14 is disposed in a central portion of the channel of the curved portion 7, enabling the flow velocity of the air flowing through the diversion passage 4 to be increased.

Moreover, in each of the above embodiments, output based on the difference between the rate of heat transfer from a pair of a heat-generating elements to the air is extracted as a flow rate signal, but a pair of thermosensitive resistors may also be disposed upstream and downstream from a heat-generating element, the heat-generating element being heated to a constant temperature, and output based on the temperature difference between the pair of thermosensitive resistors being extracted as the flow rate signal.

In each of the above embodiments, the air lead-in surface is explained as being positioned at the central axis of the intake air line 1 where the flow velocity distribution is the most stable, but it goes without saying that the effects due to the construction of the inflow port and the air lead-in surface of the present invention can also be obtained even if the air lead-in surface is not positioned at the central axis of the intake air line 1.

What is claimed is:

1. An air flow rate measuring apparatus comprising:
a detector flow tube projecting into an airflow channel so as to be perpendicular to a main direction of flow of air inside said airflow channel, a diversion passage through which a portion of said air is permitted to flow being formed in said detector flow tube; and
a flow rate detecting element disposed inside said diversion passage, wherein:
said diversion passage is constructed into an inverted U shape in which an upstream diversion passage and a downstream diversion passage each having a passage direction in a direction of projection of said detector flow tube communicate by means of a curved portion,
an inflow port of said diversion passage is constructed by removing a portion of a wall of said upstream diversion passage on an upstream side in said main direction of flow of said air, and removing at least a portion of first and second side walls of said upstream diversion passage facing each other in a direction perpendicular to said main direction of flow of said air and said direction of projection of said detector flow tube, and
a wall surface on a downstream side of said upstream diversion passage in said main direction of flow of said air at said inflow port is formed into a curved surface shape that is gradually displaced upstream relative to said direction of projection of said detector flow tube to constitute an air lead-in surface.

2. The air flow rate measuring apparatus according to claim 1, wherein:
said air lead-in surface is formed into a concave surface shape that is gradually displaced upstream from a central portion toward first and second sides relative to a direction perpendicular to said main direction of flow of said air and said direction of projection of said detector flow tube.

3. The air flow rate measuring apparatus according to claim 2, wherein:
a penetrating aperture is disposed through a substantially central portion of said air lead-in surface so as to communicate between said inflow port and said airflow channel outside said detector flow tube in said direction of projection.

4. The air flow rate measuring apparatus according to claim 1, wherein:
said air lead-in surface is formed into a convex surface shape that is gradually displaced downstream from a central portion toward first and second sides relative to a direction perpendicular to said main direction of flow of said air and said direction of projection of said detector flow tube.

5. The air flow rate measuring apparatus according to claim 4, wherein:
a discharge lane for catching foreign matter contained in said air and discharging said foreign matter to a main flow of said air flowing along a side portion of said detector flow tube is formed on said air lead-in surface.

6. The air flow rate measuring apparatus according to claim 1, wherein:
a discharge port of said diversion passage is constructed by removing a portion of a wall of said downstream diversion passage on a downstream side in said main direction of flow of said air, and removing at least a portion of first and second side walls of said downstream diversion passage facing each other in a direction perpendicular to said main direction of flow of said air and said direction of projection of said detector flow tube, and
a wall surface on an upstream side of said downstream diversion passage in said main direction of flow of said air at said discharge port is formed into a curved surface shape that is gradually displaced downstream relative to said direction of projection of said detector flow tube to constitute an air discharge surface.

7. The air flow rate measuring apparatus according to claim 1, wherein:
said flow rate detecting element is disposed in said curved portion of said diversion passage, and
a passage cross-sectional area of said curved portion is formed so as to reduce gradually from an upstream end to a position of installation of said flow rate detecting element and to enlarge gradually from said position of installation of said flow rate detecting element toward a downstream end.

8. The air flow rate measuring apparatus according to claim 1, wherein:
said detector flow tube is constructed so as to project into said airflow channel such that said air lead-in surface is positioned substantially at a central axis of said airflow channel.

* * * * *